Figure 1:
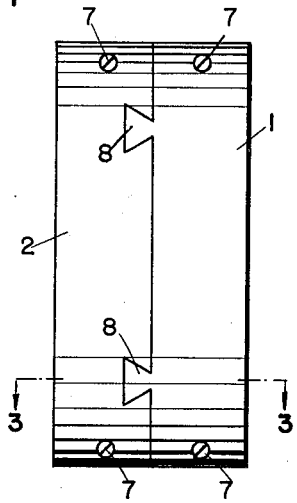

April 20, 1954     L. DAVIS     2,676,025

ADAPTER FOR SUPPORTING A WORKPIECE

Filed Dec. 6, 1951     2 Sheets-Sheet 1

INVENTOR
LARRY DAVIS

BY

ATTORNEY

April 20, 1954  L. DAVIS  2,676,025
ADAPTER FOR SUPPORTING A WORKPIECE
Filed Dec. 6, 1951  2 Sheets-Sheet 2

INVENTOR
LARRY DAVIS
BY
ATTORNEY

Patented Apr. 20, 1954

2,676,025

UNITED STATES PATENT OFFICE 2,675,025

ADAPTER FOR SUPPORTING A WORKPIECE

Larry Davis, Miami Beach, Fla.

Application December 6, 1951, Serial No. 260,162

2 Claims. (Cl. 279—123)

This invention relates to machine elements and, more especially, to an adaptor for supporting the workpiece, which may be of varying outer dimensions, in a chuck or lathe.

An object of the invention is to provide the work-gripping element of a lathe or like turning machine with a supplemental work-piece clamp which may be conveniently assembled and readily adapted thereto.

Another object is to provide a device of the character described which may be readily and economically fabricated.

A further object is to provide a work-piece adapter means which will be simple in construction and readily adjustable to the work in hand.

Other advantages of my invention will be discernible from the detailed description thereof hereinafter set forth.

According to the invention, the adapter consists of a plurality of sets of opposed jaws adapted to circumscribe the work-piece about variously spaced peripheral dimensions thereof, the outer diametrically opposed surfaces of the clamps or jaws defining uniform chuck-engaging points to be gripped by the conventional chuck or like gripping element of a machine, as for example, a turning lathe. Each pair of opposed jaws is contractible and expandable by a threaded member passing transversely through the jaws, this member being rotatable to move the jaws relative to each other. A longitudinal fastening means may be incorporated in each jaw, engageable with the jaw abutting therebeside, to provide a positive unitary work-piece clamping means.

The invention is embodied in devices which are shown for exemplification purposes only in the accompanying drawings, in which the views are as follows, like reference numerals designating identical or analogous parts throughout the several views:

Fig. 1, a side elevation of a jaw assembly, and

Figure 2:
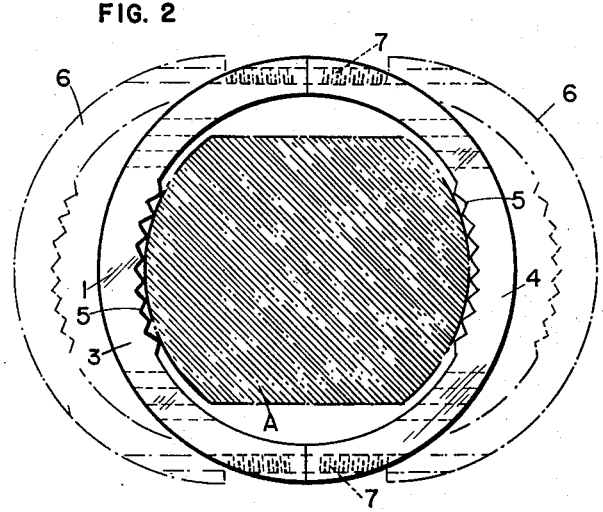
Figure 3:
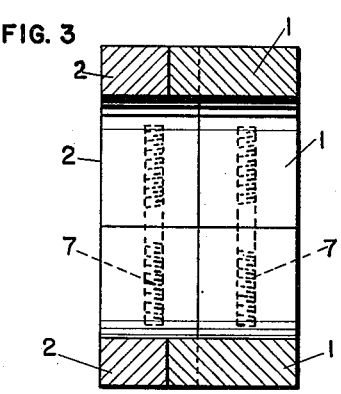
Figures 4, 5:
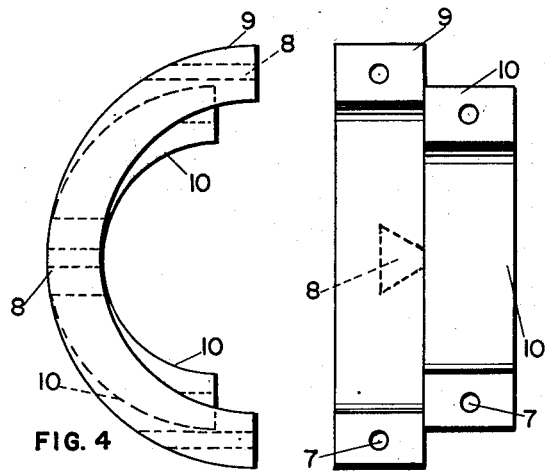

Fig. 2, an end elevation thereof;

Fig. 3, a section on line 3—3, Fig. 1;

Fig. 4, a half-sectional end view of a modified clamp, and

Figure 6:
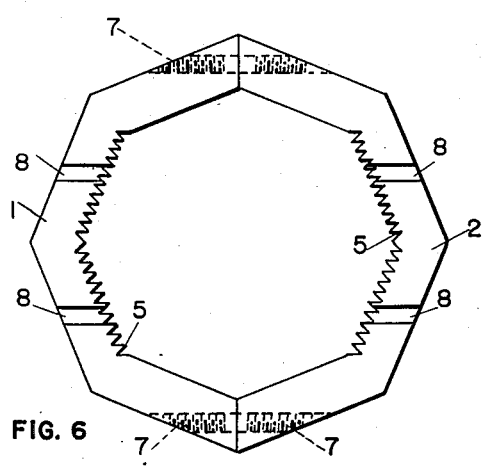
Figure 7:
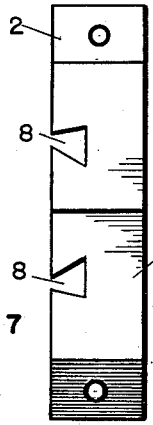
Figure 8:
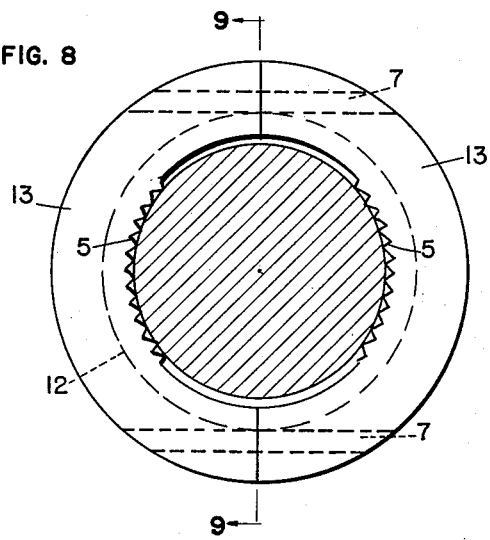
Figure 9:
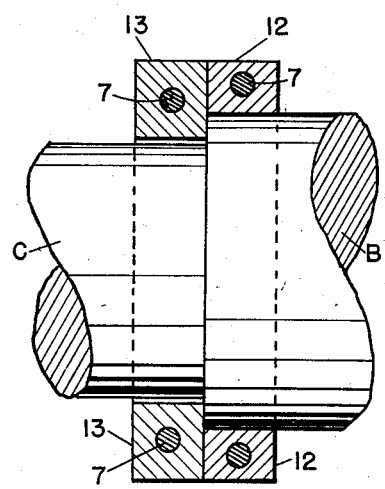

Fig. 5, a side elevation thereof;

Fig. 6, a further modification of a jaw assembly,

Fig. 7, a side elevation of the assembly in Fig. 6;

Fig. 8, an end view of still another jaw assembly,

Fig. 9, a section on line 9—9, Fig. 8, and

Figure 10:
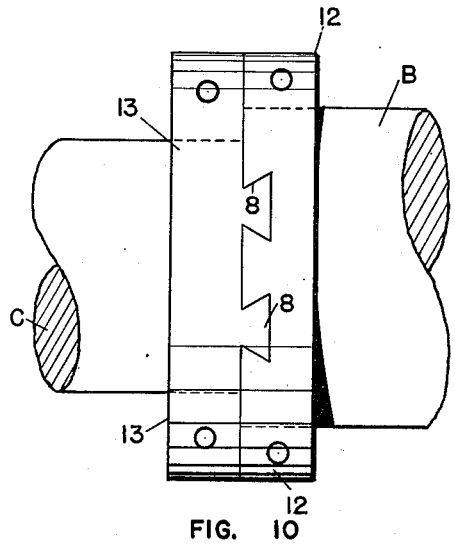

Fig. 10, a side elevation of the view in Fig. 8.

In Figs. 1 and 2 is illustrated a pair of work-piece clamps in the form of annular rings 1 and 2. Each of these rings consists of a pair of opposed jaws 3 and 4 (Fig. 2), their inner peripheries being serrated as at 5 whereby to grip a work-piece A therebetween. The jaws 3 and 4 are expandible to their broken line positions 6 through a threaded screw member 7 which is passed through the end portions of the jaws. These screws, which may be of any suitable design, are threaded so as to move the jaws relative to each other upon rotating the screws, in a manner which will be readily understood by those skilled in the art. Such a screw is sometimes known in the shop terminology as an "Allen" screw.

I may connect the clamp members 1 and 2 along their outer peripheries by any suitable coupling means as, for example, the dove-tail and slot mechanism shown at 8, Fig. 1, whereby to provide a stable and positive clamp assembly in respect to the work-piece A.

In Figs. 4 and 5, is illustrated the combination of two clamp assemblies of different outside and inside radii whereby to grip a work-piece having different cross-sectional dimensions. The jaws 9 would thus be applied to the greater dimension at the same time that jaws 10 grip the work-piece at its lesser diameter. Along any suitable point of the outer peripheries thereof, the clamps have the longitudinal coupling means shown at 8.

The principle of the foregoing construction is shown applied to clamps of polygonal shape, as in Figs. 6 and 7, these clamps being suitable for work-pieces of special shapes, as will be understood.

Figs. 8 to 10 illustrate a further modification of the invention in that the jaw members have like outside diameters but different inside dimensions whereby to grip a shaft, for example, having a greater diameter at the piece B and lesser diameter through the stem C.

In this construction, the clamp assembly comprises a relatively greater diameter gauge jaw 12 and a lesser jaw 13, the outer peripheries of these clamps being of uniform diameters. Thus, this clamp assembly is applied to the work-piece as shown, thereby permitting the work to be accommodated with facility in the conventional gripping element of a lathe.

In practice, the clamps would be applied to a work-piece of varying stock dimensions in a manner which will be readily understood from the foregoing description of the invention, the work being positively gripped in the clamp assemblies and the assemblies permitting the entire combination to be received in the chuck or other gripping elements of the machine handling the operation to be performed on the work-piece.

The coupling means 8 may, of course, be placed at any convenient points along the outer peripheral surfaces of the jaw members and may be formed so as to permit the spacing of the individual jaw assemblies longitudinally of the work-piece and longitudinally from and between each pair of rings, if so desired.

Of course, the invention will be seen to be susceptible of a variety of modifications without departing from the scope thereof, as hereinafter claimed.

I claim:

1. An adaptor for supporting a work-piece in a chuck or lathe comprising a plurality of axially-alined pairs of opposed jaws, each pair engageable with said work-piece in gripping relation therewith, some of said pairs bearing longitudinally projecting key members formed integrally therewith and the next adjacent pair thereto being slotted to form complementary key-ways adapted to receive said key members whereby to lock said key-bearing pairs to said adjacent pair therebeside, threaded shafts connecting the jaws in each of said pairs and turnable to expand and contract each pair relative to said work-piece.

2. The invention as defined in claim 1, and: the inner peripheries of said jaws being of variable radii and serrated for positive gripping engagement with said work-piece.

References Cited in the file of this patent

UNITED STATES PATENTS

| Number | Name | Date |
|---|---|---|
| 78,922 | Brecht | June 16, 1868 |
| 274,040 | Smith | Mar. 13, 1883 |
| 1,314,601 | McCaskey | Sept. 2, 1919 |